United States Patent [19]

Lissner et al.

[11] 3,973,273

[45] Aug. 3, 1976

[54] MAGNETIC DISK STORAGE APPARATUS

[75] Inventors: Rudolf W. Lissner; Richard B. Mulvany, both of San Jose, Calif.

[73] Assignee: International Business Machines Corporation, Armonk, N.Y.

[22] Filed: May 12, 1975

[21] Appl. No.: 576,907

Related U.S. Application Data

[60] Continuation of Ser. No. 428,608, Dec. 26, 1973, which is a division of Ser. No. 206,688, Dec. 10, 1971, Pat. No. 3,786,454.

[52] U.S. Cl. .................................. 360/98; 360/133
[51] Int. Cl.² ...................... G11B 5/48; G11B 21/08
[58] Field of Search .................. 360/86, 97, 98, 99, 360/106, 133

[56] References Cited
UNITED STATES PATENTS
3,710,357  1/1973  Buslik ................................ 360/99

Primary Examiner—V. P. Canney
Attorney, Agent, or Firm—Nathan N. Kallman; Richard E. Cummins

[57] ABSTRACT

A data storage apparatus includes an interchangeable sealed cartridge, enclosing magnetic disks, accessing magnetic head arm assemblies, a movable carriage to which the head arms are mounted, and a drive spindle on which the disks are seated. This portion of the storage apparatus is referred to as a data module. For accessing the heads to selected data tracks, coupling means are provided to engage the carriage and head arm assemblies with an external actuator, such as a linear D.C. motor or voice coil motor, disposed in a disk file housing. The file housing includes a drive motor coupled by pulley means, for example, to the enclosed spindle to provide rotary motion to the disks. This latter portion of the storage apparatus is referred to as the data module drive. The data module drive operates as a data storage apparatus when combined with one of many interchangeable data modules.

16 Claims, 29 Drawing Figures

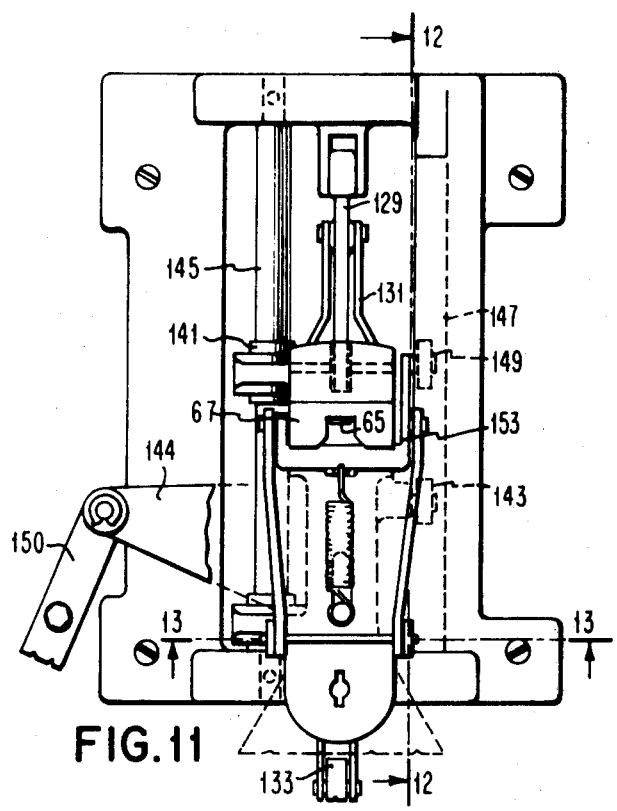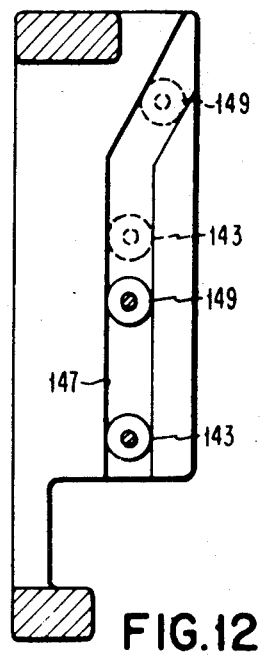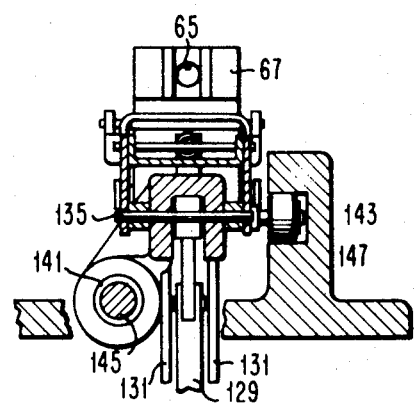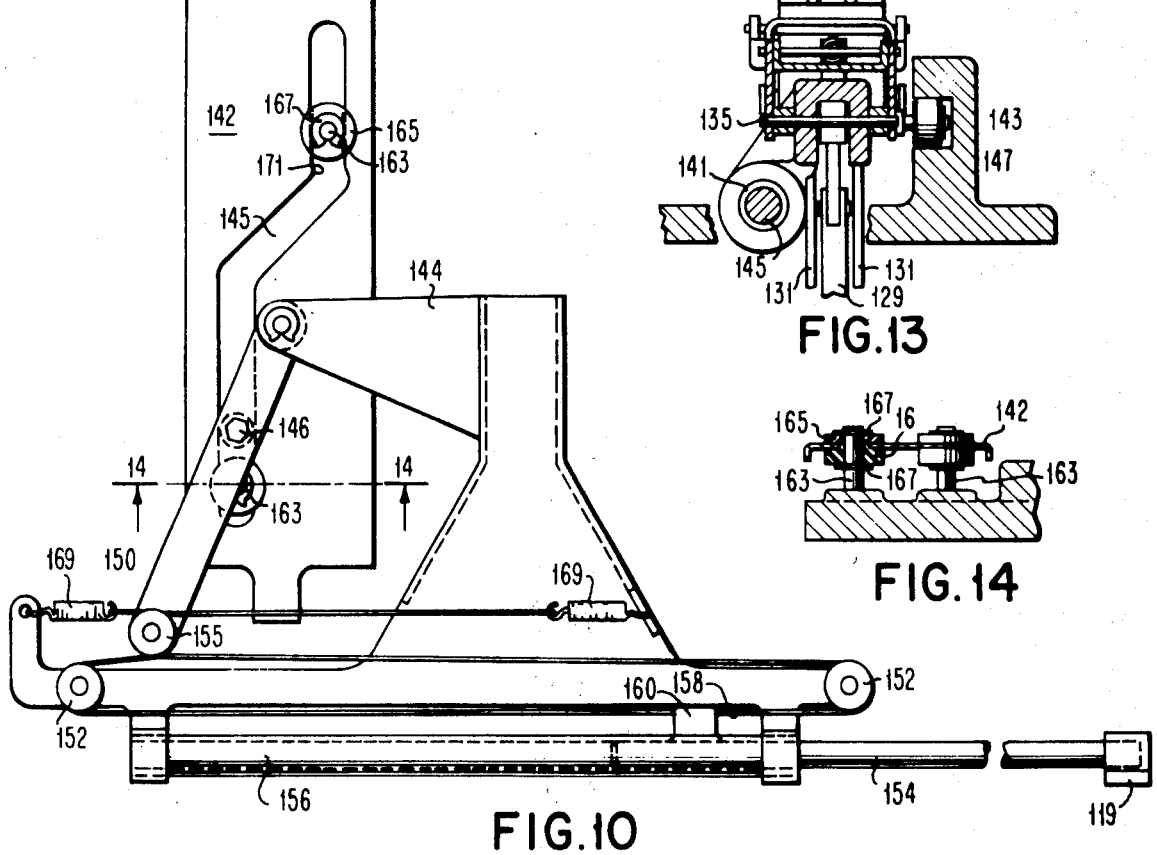

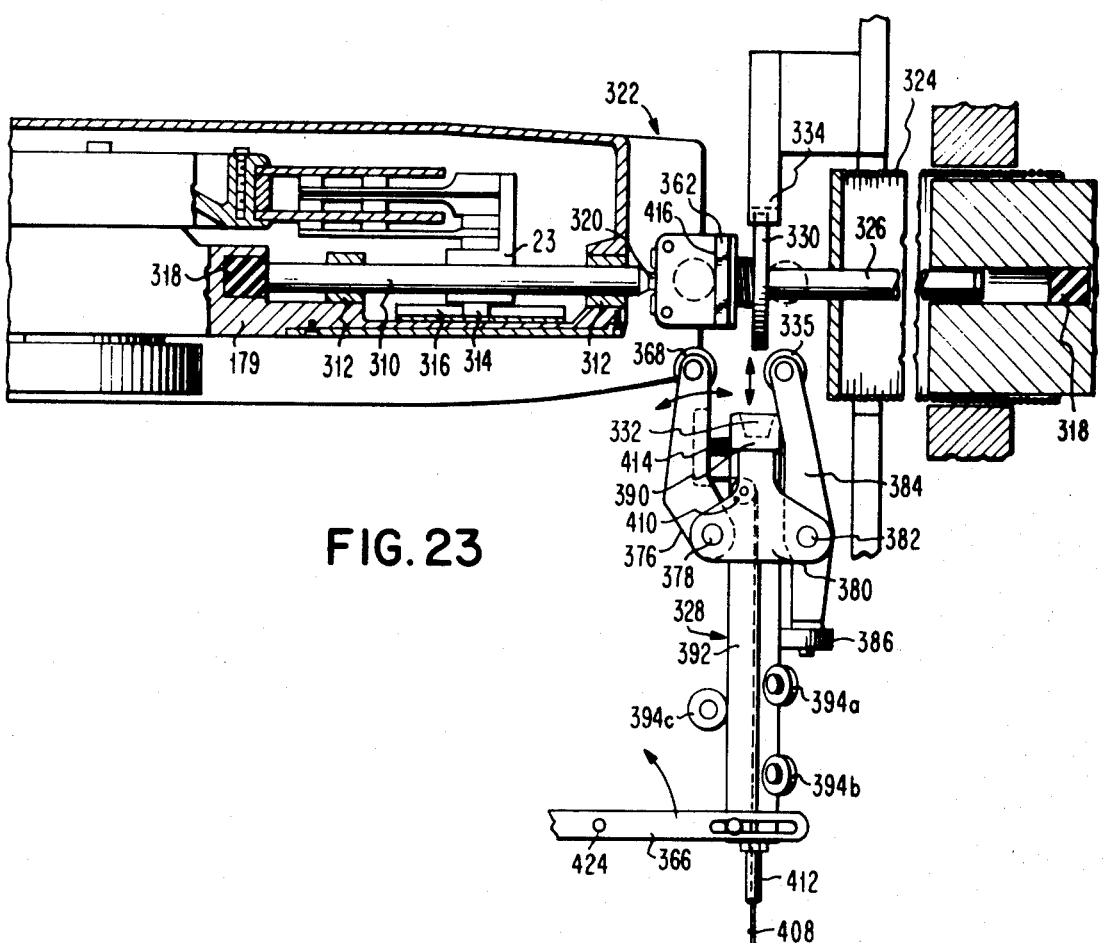
FIG. 23
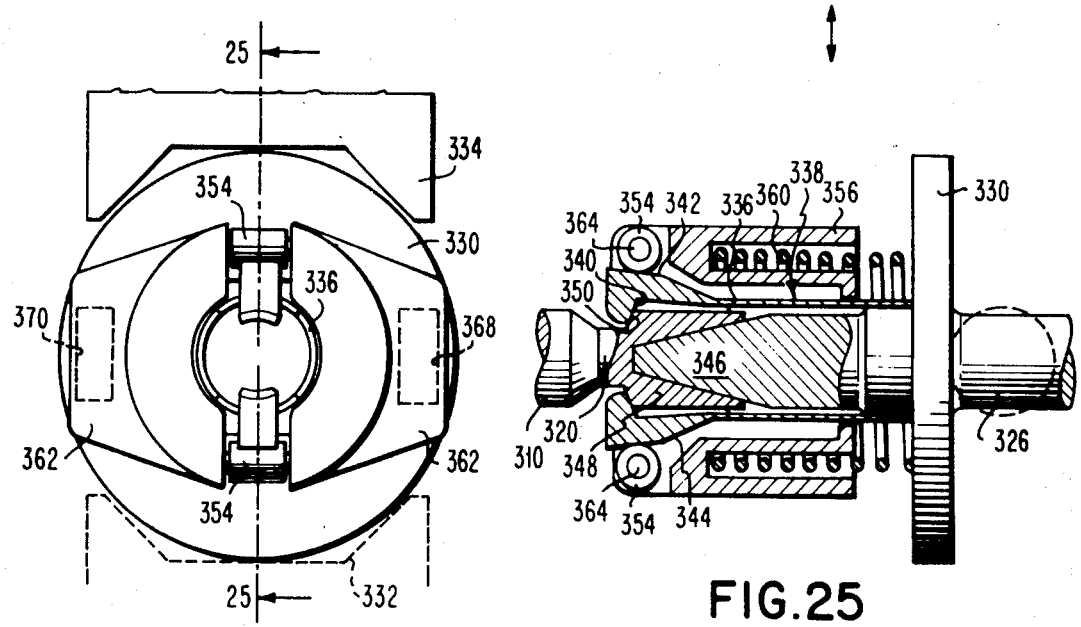
FIG. 24
FIG. 25

MAGNETIC DISK STORAGE APPARATUS

CROSS-REFERENCE TO RELATED APPLICATION

This application is a continuation of application Ser. No. 428,608, filed Dec. 26, 1973. Ser. No. 428,608 which is itself a division of application Ser. No. 206,688 (now U.S. Pat. No. 3,786,454), filed Dec. 10, 1971. U.S. Pat. No. 3,710,357 issued to W. S. Buslik and assigned to the same assignee, discloses a magnetic disk storage apparatus employing a sealed enclosure, which contains magnetic heads attached to a head carriage, a carriage actuator, and a magnetic record disk.

BACKGROUND OF THE INVENTION

1. Field of the Invention

This invention relates to a novel and improved data module drive utilizing a sealed interchangeable data module.

2. Description of the Prior Art

Presently known magnetic disk file data storage facilities utilizing interchangeable disks or disk packs are configured in the form of a drive that includes read/write heads, head actuator means and a drive spindle. The disk pack may contain a single disk or several disks attached to a hub suitable for mounting on the drive spindle.

In this application, "interchangeable" shall refer to a medium, such as a disk module that has universal substitution without loss of data for use on all the devices with which it is developed to work. To be truly interchangeable, all of the hardware elements involved in the mechanical, electronic and magnetic implementation of storage must have sufficient repeatability, so that the summation of all the deviations from perfection, for all elements, does not exceed the total variance, i.e. engineering tolerance allowed.

The most common pack configuration presently in use is contained in a two part plastic cover assembly. The two part cover has a circular bottom panel section that is removed by the operator prior to installation of the pack on the drive spindle, and a cylindrical side section and top that is removed at the time the pack is mounted on the drive spindle. It is apparent that the removal of the pack covers exposes the pack to contamination during a loading/unloading cycle.

An alternate pack cover configuration provides for an integral cover assembly that remains with the pack. Data heads are inserted into the pack through a cover door that is opened during pack installation. The integral cover configuration provides some improved protection of the pack compared to the removal cover type. However, in both configurations, the drive data heads are exposed to contamination during the pack loading/unloading cycle.

A typical interchangeable disk pack file facility utilizes two or more data read/write heads mounted to a carriage assembly that positions the data heads over selected data track locations. These heads must be able to read any data track written on its associated disk surface in any similar file facility. Head position may be controlled by a mechanical detent acting on the head access means; or the heads may be positioned by a closed loop servo system using a servo reference and a servo position sensing transducer. Such control of radial head positioning relative to the data track is difficult and costly in a typical high track density, interchangeable pack file facility.

With the evolution of the magnetic disk file, increased bit and track densities and resultant increased storage capacity have been realized with increased actuator speed and access time. These improvements have required more accurate radial positioning of the data head relative to the disk surface. The close spacing of the head to the disk, which may now be in the order of 50 microinches or less, requires stringent control of the disk file apparatus to avoid head/disk damage, which may be caused by particle contamination, for example. However, the challenge remains to position uniformly all data heads controlled by the reference system to a radial position tolerance equivalent to a fraction of a track width. To permit pack interchangeability, all heads in all files must be similarly positioned.

Also, the achievement of increased bit density imposes requirements for more precise control of the skew alignment of the read/write heat gap. Misalignment of the read head gap relative to write head gap will cause reduced signal output and bit timing shifts that may cause read errors. Control of the skew alignment of all data heads to assure error free pack interchangeability may represent a significant portion of the manufacturing cost of each data head.

Furthermore, presently known disk storage files utilizing interchangeable disk packs must provide means for the retraction and loading of the data heads relative to the pack disk surfaces. The head retract-load function adds cost to the file and increases the exposure of the disk pack to damage resulting from head-disk impact during retract or load.

In addition, when inserting another disk pack into the file, the disks are usually at a different temperature than the head assemblies. This temperature differential, which is reflected in the radial dimensions of the disks relative to the lengths of the head arms, presents problems in the "Seek Track" function, and therefore a warmup period is needed prior to recording or readout. Consequently, there is an undue loss of costly computer operating time.

SUMMARY OF THE INVENTION

An object of this invention is to provide a novel and improved magnetic storage apparatus.

A further object is to provide a storage apparatus wherein the requirements for manufacturing and assembly tolerances are minimized, thereby making the manufacture and assembly less expensive.

A still further object is to provide a data module file facility wherein higher data density and performance is substantially enhanced, while preserving the disk cartridge interchangeability function.

Another object is to provide a storage facility that does not require head retract mechanisms.

Another object is to provide a storage disk facility that provides improved contamination control.

According to this invention, a magnetic disk file apparatus incorporates an interchangeable sealed data module that encloses magnetic disks; accessing head arm assemblies; a movable head carriage; a drive spindle for rotating the disks; and a common frame structure to maintain alignment between the module components. When mounted to a cooperating data module drive, the spindle is engaged by means of a pulley and belt means, by way of example, with a drive motor, and the head assemblies are coupled to a bidirectional actuator, such as a linear DC motor or voice coil motor. Each movable head assembly is permanently related to an associated disk surface, and has a limited path of travel radially across the apertured disk between the outer and inner peripheries of the disk.

In a specific embodiment, the sealed module includes an access door allowing the coupling of head assemblies to the external actuator, and thereby affording radial accessing of the heads to different data tracks. External drive means coupled to the drive spindle, by means of a pulley and belt, are provided for rotating the disks. Locking means serve to maintain the head assemblies, the head carriage, disks and spindle all stationary, whenever the module is removed from the file housing.

To insure proper coupling and alignment of the head assemblies of the module to the external actuator for disk file operation whenever a similar module is inserted and engaged with the drive housing, registration, positioning and alignment means are provided. The novel configurations of the interchangeable module, and of the cooperating drive housing allow repeatability of accurate registration of the module and its components with the disk drive housing and its parts. Also, faster access is achieved due to the smaller mass of the head arm assemblies and the carriage. There is no need for head load-unload or retract mechanisms, and the total hardware for the disk file system is substantially reduced and simplified. The need for precise radial head position adjustment is eliminated. Additionally, the sealed module enjoys contamination control and therefore experiences less error and data loss.

BRIEF DESCRIPTION OF THE DRAWINGS

The invention will be described in greater detail with reference to the drawing in which:

FIG. 10 is a top view of the door opener mechanism;

FIG. 11 is a top view of the load cart, shown in FIG. 3, used to load and register a data module in the drive housing;

FIG. 12 is a sectional view of a guide, taken along lines 12—12 of FIG. 11;

FIG. 13 is a section taken along lines 13—13 of FIG. 11;

FIG. 14 is a section taken along lines 14—14 of FIG. 10;

FIG. 23 is a side view, partially in section of an alternative coupling device;

FIG. 24 is a front view of the collet chuck incorporated in the coupling device of FIG. 23; and FIG. 25 is a side view, taken along lines 25—25 of FIG. 24.

Similar numerals refer to similar elements throughout the drawing.

DESCRIPTION OF THE PREFERRED EMBODIMENT

Figure 1:
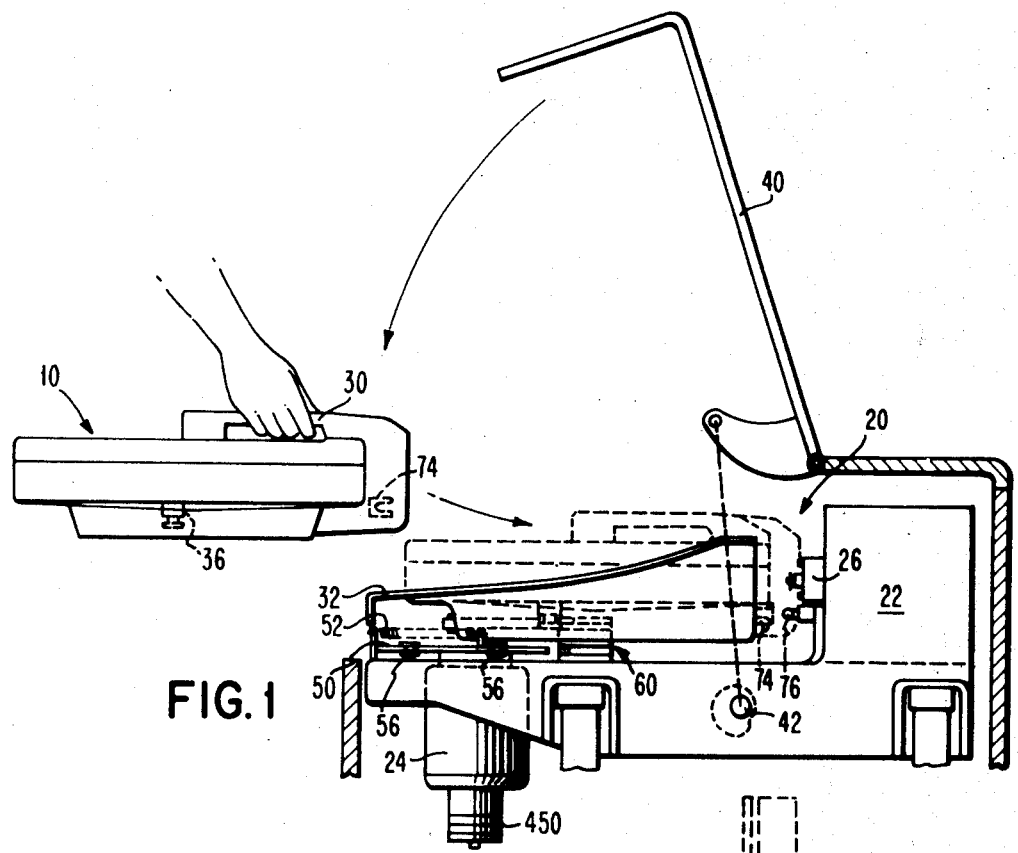
FIG. 1 is a side elevational view representing the insertion of an interchangeable data module into a drive housing, in accordance with this invention.

In accordance with an embodiment of this invention, an operating disk file apparatus includes an interchangeable sealed data module 10 containing a number of rotary magnetic disks 12, movable accessing magnetic heads 14, spindle 16, and having an exposed drive pulley 18. The module 10 is engageable with a data module disk drive housing 20, which includes a head actuator such as a voice coil motor 22, and a drive motor 24, to rotate the disks (see FIGS. 1 and 3). The module 10 may be easily and conveniently replaced and interchanged with similar modules. A coupling device 26 serves to connect the head actuator 22 to a carriage 23 supporting the head assemblies 14, and electrical connection means 28 (FIG. 9) are provided to conduct signals to the magnetic heads. The head assemblies 14 (only four being shown for simplicity and convenience) may include one servo head that affords track following of the data tracks. In addition, more than one head assembly 14 may be provided for each disk data surface.

Figure 4:
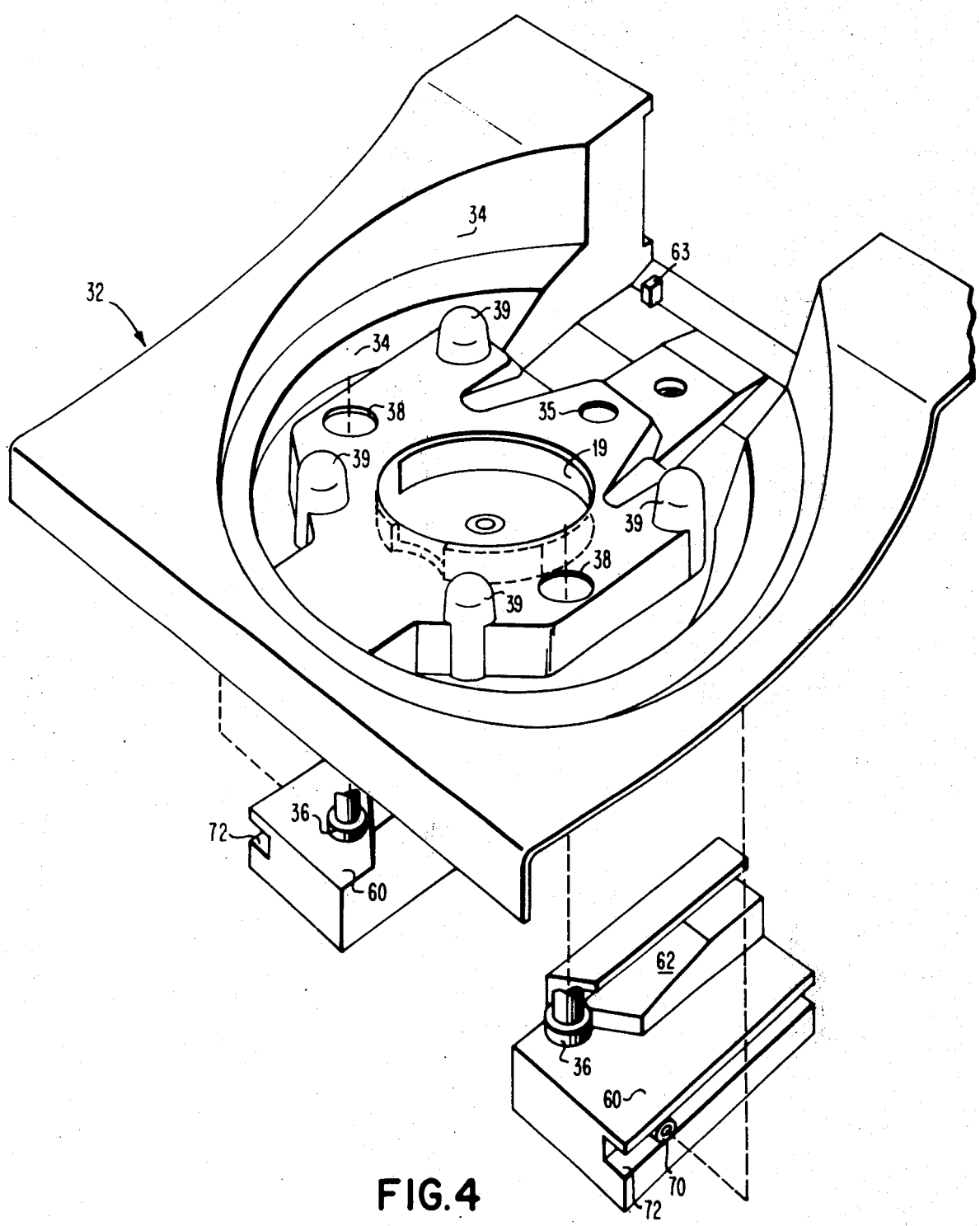
FIG. 4 is a perspective view of the tray or receptacle to which the module is seated and aligned relative to the drive housing.
Figure 5:
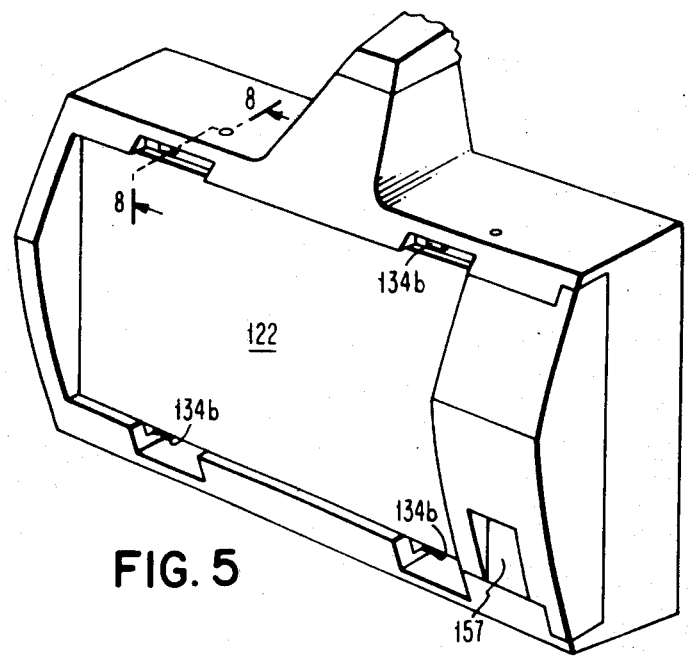
FIGS. 5 and 6 respectively are perspective diagrams of the door and door locking mechanisms that allow sealing of the module when the module is removed from the drive, and opening of the module to engage the module head carriage and electrical connection means with the drive when the module is loaded into the drive.

As shown in FIG. 1, in order to assemble the module 10 to the drive housing 20, the operator by means of a handle 30 lowers the module into a shroud or tray 32 (see FIG. 4). The tray has sloped or tapered sides 34 that coarsely position the cartridge, and provide a data plane or reference for alignment.

The module also has alignment cavities 29 in its lower surface which align with protruding guides 39 in the tray 32. The combination of the module covers, the sloping side walls of the tray 32, the guides 39, and the cavities 29 serve to accept the module from the approximate position provided by the operator and align the module with greater precision as the module is lowered into the tray.

All of the noted guiding elements are positioned so that only the data module covers are contacted during operator loading into tray 32. Pulley clearance aperture 19 accepts the module pulley 18, foot clearance aperture 38 accepts the module registration feet 36, and load pin clearance aperture 35 accepts module load pin 66.

The tray 32 is supported and guided by two rollers 70 which run in grooves 72 in guide structures 60. The tray is further supported by a mounting plate 125 which is attached to the module retaining arm 124. The tray 32 is aligned in the direction of proposed movement of the module to enable the module to engage the coupling mechanisms provided by the stationary file housing 20.

Once the module 10 is seated in the shroud 32 by the operator in a desired alignment, a hinged door 40 is closed (as depicted by the arrow in FIG. 1), simultaneously causing the rotation of a camshaft 42 that is coupled to the door 40. The rotary motion of the camshaft 42 is translated to linear motion to accomplish a series of mechanical steps for linking the module 10 with the file housing 20 in an operating condition.

Figure 2A:
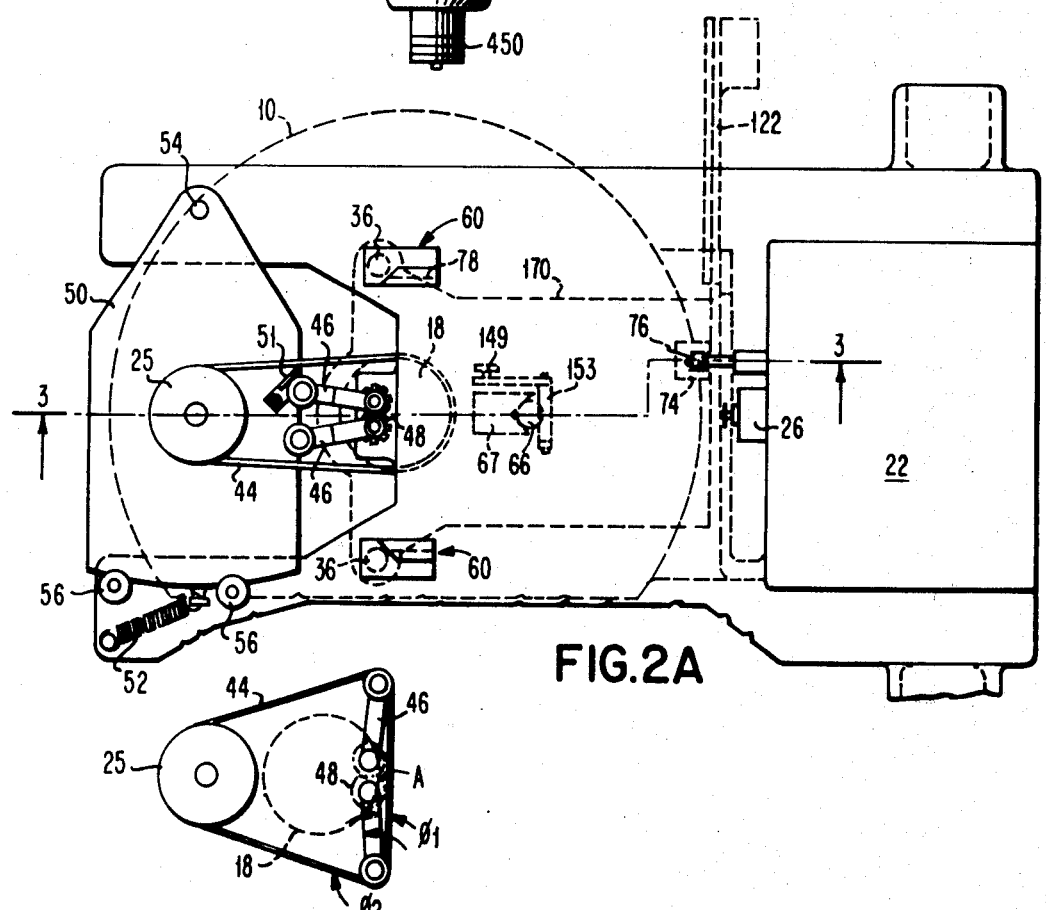
FIG. 2A is a top plan view illustrating the interconnections that function to load the module into engagement with the drive housing.
Figure 2B:
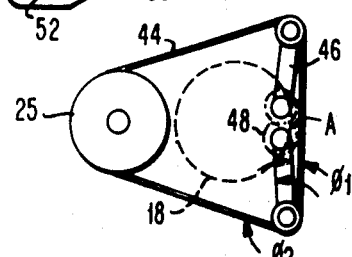
FIG. 2B is a partial plan view denoting the condition of disengagement of the module.

With reference to FIGS. 2A and 2B, the mechanism for engaging and disengaging the drive pulley 18 of the module 10 with a drive belt 44 and drive motor pulley 25 is illustrated. In the disengaged condition as illustrated in FIG. 2B, a pair of pivotable idler arms 46 are positioned to hold the belt 44 in an extended position while the belt 44 is also engaged with the drive motor pulley. The idler arms are spring biased so as to tension the belt. The arms are aligned with the belt so that a force applied at point A will cause the arms to be forced rearward in the direction of the motor. The idler arms and belt are aligned so that angle $\phi_1$ is less than $\phi_2$ at all times to assure that a force applied at A will force the arms rearward. When the module 10 is inserted into the shroud 32 and properly aligned and registered by means of the feet 36, the pulley wheel 10 of the module 18 is positioned within the perimeter of the belt 44. As the module is moved forward toward engagement with the drive housing, the data module pulley 18 contacts the belt at point A thus forcing the arms rearward. The idler arm length is selected so that the idler arms and their attached belt pulleys will pivot around the outside of pulley 18, as the data module is moved forward into engagement with the file housing. As the idler arm pulleys reach a point where they contact the belt in planes tangent to the outside diameter of the motor pulley and the data module pulley, further motion of the data module pulley 18 requires motion of the motor pulley. The two idler arms are connected together by two gears 48 to assure that they move in unison. The arm spring bias is supplied by a torsion spring 49 which supplies the necessary torque.

To ensure suitable coupling of the belt with the drive pulley 18 and drive motor 24, a motor mount plate 50, to which the drive motor 24 is attached, serves to tension the belt 44 against the motor 24 and pulley 18 of the module, in conjunction with a spring 52 attached to the plate 50. The mounting plate 50 is pivotable about a fixed point 54 and is moved along rollers 56, as the motor 24 is urged forward in the direction toward the acttuator 22. As the data module completes its engagement motion, the idler pulleys reach their tangent position, and the forward motion of the data module pulley 18 moves the motor and its mounting plate 50 in a direction toward the data module. Cam 51 mounted on the mounting plate 50 engages ball bearings 53 on the idler arm 46, and thus forces the idler arm pulleys out of contact with the drive belt 44. The drive belt is not tensioned between the data module pulley and the spring loaded motor mounting plate 50. In this manner, the belt 44 is tautly engaged with the motor drive 24 and the pulley 18, so that the rotary drive motion of the motor 24 may be translated to the pulley 18 for rotating the disks 12.

Figure 3:
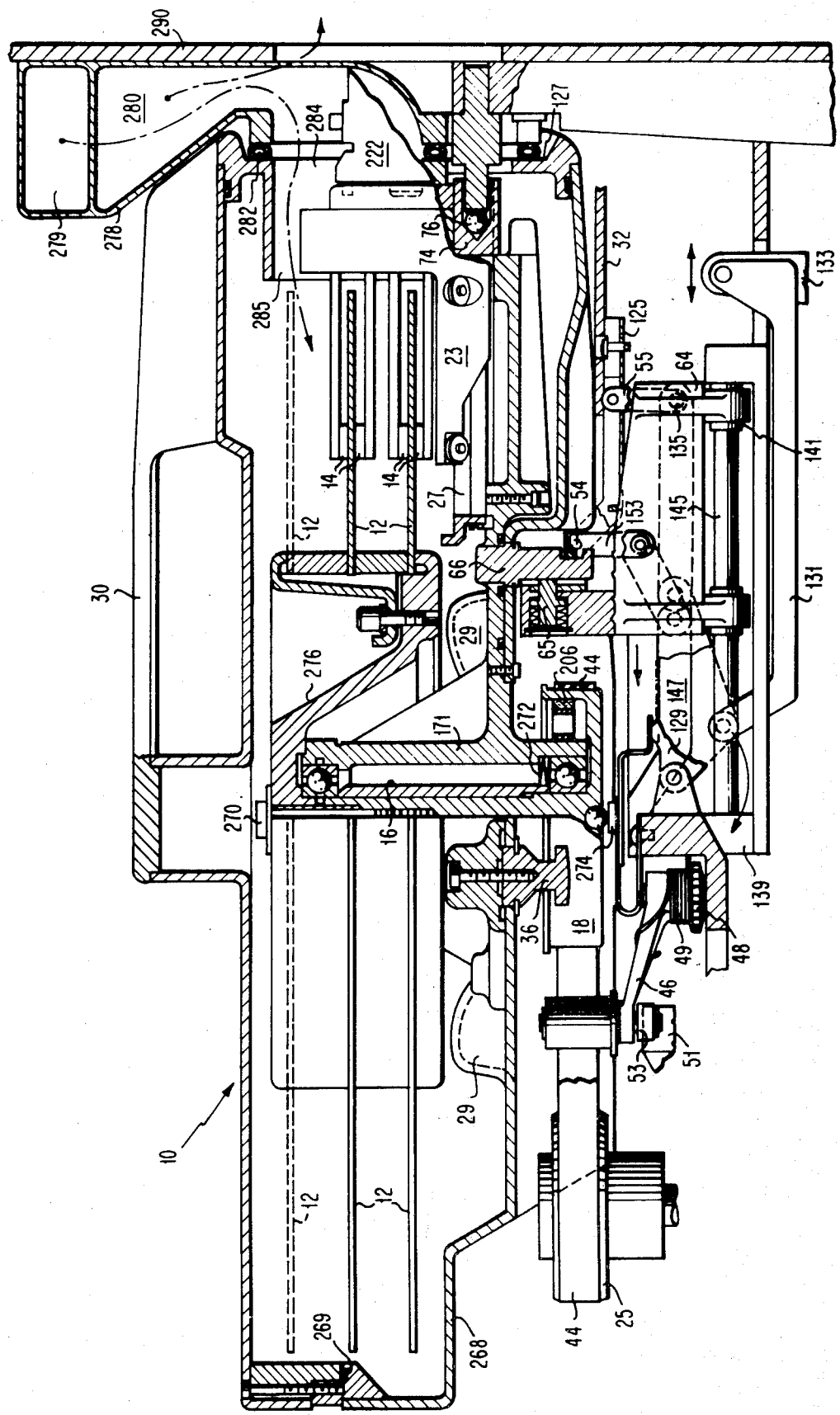
FIG. 3 is a sectional view taken along lines 3—3 of FIG. 2A, depicting detailed structure of the novel data module of this invention.

With reference to FIGS. 3 and 11, the module 10 and tray 32 are moved forward to the data module loaded position by the linear motion of load cart 64. The load cart is operatively connected to camshaft 42 by toggle mechanism 129, link 131 and cam follower lever 133. The toggle mechanism 129 is connected to the load cart 64 by toggle pivot pin 135. The toggle 129 is supported at its end opposite pin 135 by pin 137 which is supported by load cart and base 139. The toggle mechanism 129 provides a rapid loading motion at the start of module loading and a high retaining force when the module is registered in the file housing. The load cart 64 is supported and guided by ball bushings 141 and bearing roller 143. The bushing 141 is supported in turn by support rod 145 and the bearing roller 143 by cart support and retainer cam track 147.

At the time of operator module handling, the load cart 64 is positioned so that it will not contact the data module. Initiation of the module loading cycle through the closure of door 40 moves the load cart 64 in the direction toward the drive 20 and voice coil motor 22.

The load cart 64 incorporates a spring loaded pin 65 suited to provide a registration force against module load pin 66. The cart 64 also incorporates a load pin U-block 67 suited to engage to module load pin 66, and position this pin in alignment with spring loaded pin 65 as the load cart is moved forward.

As the cart 64 moves forward, roller 149 rides down track 147 causing module retainer 153 to rotate counterclockwise and engage retaining slot or load pin 66. Simultaneously, tray 32 is moved rearward in relation to the motion of cart 64, thus moving the data module and its load pin 66 into engagement with spring loaded pin 65. The relative motion of tray 32 to the load cart 64 is provided by the action of mounting plate 50. The mounting plate 50 is supported by pivot pin 54 carried in module retainer 153. The plate 50 is also supported by link 55. Counterclockwise rotation of the retainer 153 moves mounting plate 50 horizontally in a direction toward load pin U-block 67. When the shroud 32 and module 10 are in their forwardmost position, a conical recess or socket 74 engages a locating ball 76 that is fixed to the baseplate of the drive housing 20. At such time, feet 36 are positioned on the flat ways 62 and abut the side 78 of the way structure, so that the module is stable in a fixed position.

When the module becomes properly positioned with reference to the drive housing, and the ball 76 and socket 74 become engaged, a coupling mechanism 26 illustrated in detail in FIGS. 9, 15, 16A, 16B, and 17-20 acts to connect the linear motor 22 to the head carriage assembly 23. The linear actuator 22 may be a voice coil motor, by way of example, that includes a bobbin structure on which a coil is disposed. The structure is located in a magnetic field supplied by permanent magnets. Current signals are fed to the coil to actuate the bobbin and to move the bobbin in a predetermined direction for a given distance. The bobbin is coupled to the head carriage assembly 23, so that the heads 14 may be moved to selected data tracks on the surfaces of the disks 12.

To accomplish an effective connection of the voice coil bobbin to the head carriage, a retention mechanism holds the bobbin in a position for mating and locking with the carriage assembly 23 in the data module 10. The mechanism also activates the coupler 26 and releases a latch that holds the carriage 23 securely in its home position. To unlatch the carriage 23 and to release the retention mechanism from the bobbin 22, a coupling driver 82 is aligned with a key slot of a detent bearing 84. In turn, the slot 85 of an acceptor 86 (FIG. 20) is aligned parallel with the longitudinal axis of the bobbin of the voice coil motor, and also parallel to a bayonet pin 88 located in a bobbin eccentric shaft 90. In this mode, a solenoid 92 (represented by arrow) is energized causing a cable 94 that links the solenoid to the drive 82 to be under tension. The driver 82 is pulled down with a key 96 engaging a slot in the detent bearing 84 with the acceptor 86 in its lowest position. A pivot lever 98 is rotated to its extreme counterclockwise position, and brings link 100 and latch release lever 102 to their extreme upper position. At this point, a microswitch 104 is in its normally open position, and a spring 106 is under compression. A cam 108 that is located on the outer surface of the acceptor 86 forces a yoke 110 back. Also, a nesting plate 112 that is attached to the yoke 110 through the two slots 85 is pulled back to its extreme position. The plate 112 is thus forced to its extreme lower position, by two torsion springs 116. When the carriage latch lever 102 is released, and the acceptor shaft 86 is retracted, and the nesting plate 112 is dropped out of the way, the bobbin and carriage are automatically locked together as a unit, and current signals may be applied to the bobbin coil to accomplish head accessing.

Before the voice coil bobbin and head carriage assembly can be connected, it is necessary to open a sealed door structure 122 that is part of the module 10. The door structure must be opened in advance of the meeting and locking of the coupling mechanism 26 between the voice coil motor 22 and the head carriage 23. To accomplish the opening of the door 122, the rotary force of the camshaft 42 is translated to linear motion. In turn, the translated linear motion is amplified by mechanisms having mechanical advantage, while providing linear force in a plane perpendicular to that of the load cart motion.

With reference to FIGS. 5–8, the motor 122 is first moved outwardly in the module structure away from its seal 123, before the door can be slidingly opened to allow connection of the actuator bobbin to the head carriage.

The outward motion of door 122 is accomplished at the time the module is loaded into tray 32. The tray incorporates door unlatch post 63. This post contacts door unlatch button 124 at the bottom of the module. In response to contact with post 63, the button 124 applies a vertical force and motion to connecting link 126, thereby rotating a latch lever 128 about a pivot 130. As a result, a latch push rod 132 is moved laterally causing an operating finger assembly 134 to rotate around a pivot pin 136. To open the door and break the door seal, one finger 134a pushes the door 122 outwardly. The extent of movement of the door is limited by the cam contour of latch lever 128.

The door 122 now is seated in a guide slot 140, to permit sliding of the door sideways and to accommodate the fixed bobbin structure that is being approached by the module 10 and its head carriage assembly 23. With reference to FIGS. 5–8 and 10–14, a follower of the camshaft 42 actuates a cam plate 142 to move in a direction (upward as depicted in FIG. 10).

As depicted in FIGS. 10 and 14, the cam plate 14 is supported and guided by guide shafts 163. The guide bushing 16 and washer 165 locate the cam plate 142 vertically by means of snap rings 167. The cam follower bearing 146 engages the cam slot in camplate 142 and is in turn mounted to pulley arm 150. The pulley arm is pivotably supported by a door frame 144 which is rigidly mounted to load cart 64. The door opening mechanism, depicted in FIG. 10, is illustrated in the "Door Open" position. Rearward (upward in FIG. 10) motion of the load cart will bring cam follower bearing 146 into engagement with inclined track section 145. Further rearward motion of load cart 64 would then cause a counterclockwise motion of pulley arm 150, thus moving arm pulleys 155 to the right tending to close the module door. The motion of cam plate 142 by the cam shaft 42, accelerates the motion of the door opening action to assure that the door 122 is fully open prior to module registration.

Figure 6:
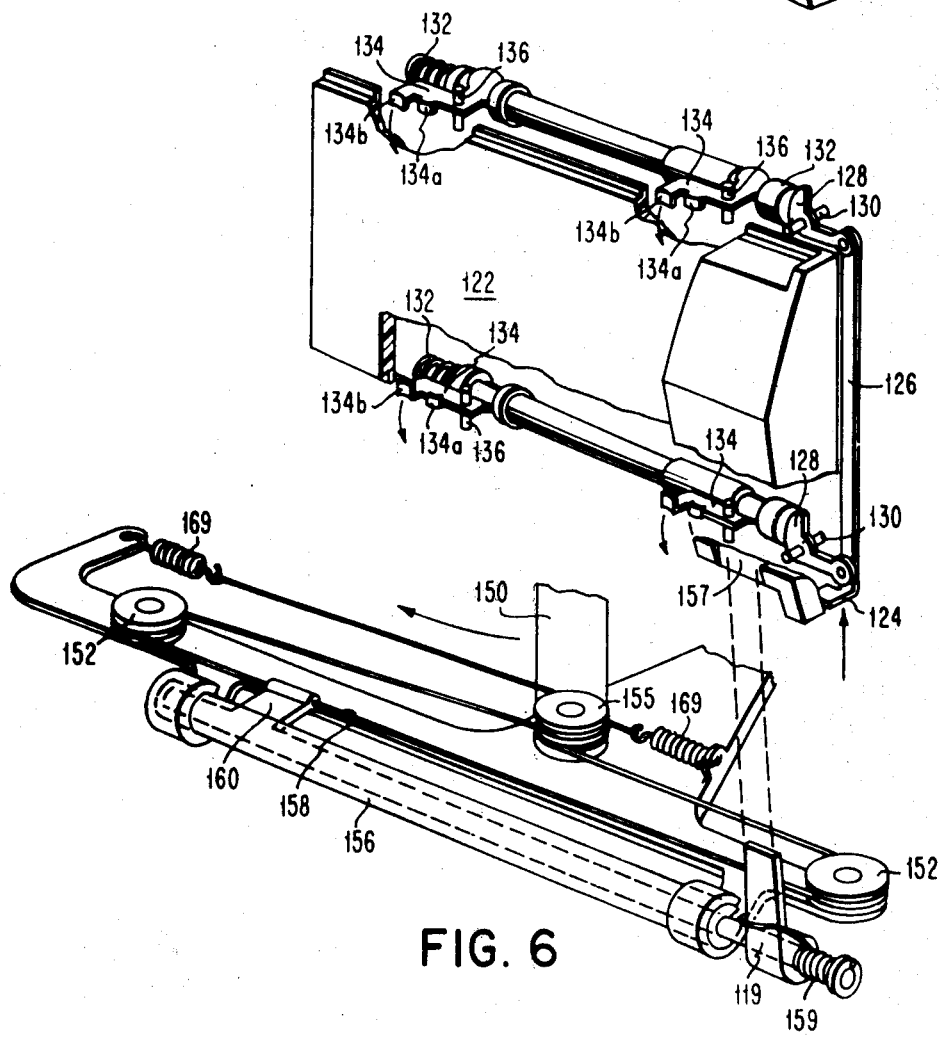
Figure 7:
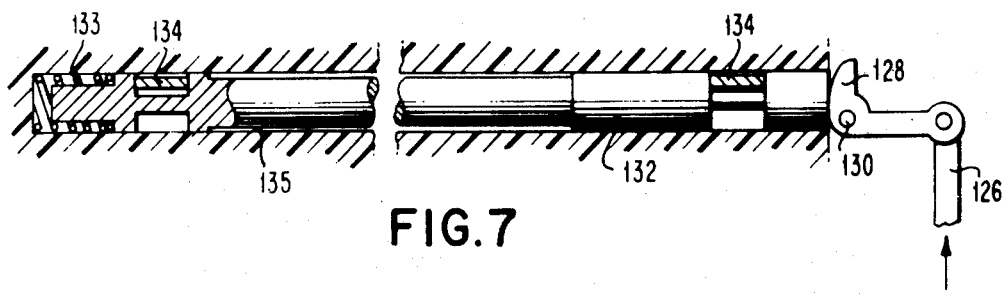
FIG. 7 illustrates a section of the door locking actuator mechanism.
Figure 8:
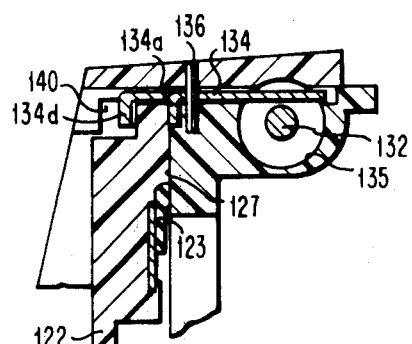
FIG. 8 is a partial sectional view, taken along lines 8—8 of FIG. 5.

Longitudinal door motion in a direction perpendicular to the motion of travel of the cart 64 is provided by a finger assembly 134 which is carried on a push rod 154. Finger 134, which engages door cavity 157, and is pivotably mounted to push rod 154, is spring biased into engagement with the door cavity 157 by a torque spring 159, as shown in FIG. 6.

When tray 32 is moved away from spring loaded pin 65 at the end of the module "Unload" cycle, finger 134 is depressed downward by contact with the front end of tray 32. Push rod 154 rides in a slotted sleeve 156. A key 160 extends from the side of rod 154 and is attached to a cable 158. The cable is wrapped around the pulleys 152 (the axles being fixed to frame 144) and two pulley arm pulleys 155. The ends of cable 158 are tensioned by springs 169, as shown in FIGS. 6 and 10.

The stroke multiplication provided by the pulley system (2:1) and the pulley arm (2:1) provide a 4:1 multiplication of the input of the cam plate 142.

A cam slot rise 171 provides an overtravel motion at the end of door closure to assure complete longitudinal motion of door 122. The overtravel is accommodated by tension springs 169.

Figure 21:
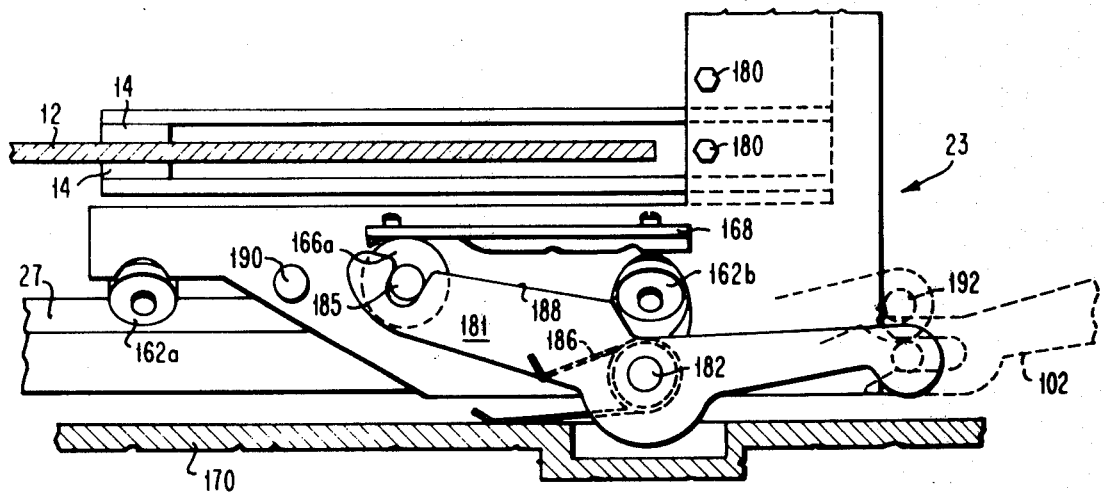
FIG. 21 is a side view of the carriage locking mechanism.

With reference to FIG. 21, the transducer carriage 23 is supported on six ball bearing rollers 162. Four rollers are mounted with their rotational plane 45° to the vertical and contact two inclined way surfaces lying in a plane parallel to the direction of carriage access motion. The bearings so located include forward bearing 162a, rear bearing 162b and two additional bearings at the opposite side of the way (not shown).

The carriage 23 is biased downward against the way 27 by the action of two outrigger ball bearing rollers 166a, b. Outrigger bearing 166a runs along the under surface of fixed way 168. The fixed way 168 is attached to the data module casting or frame assembly 179. The second outrigger ball bearing 166b is biased downwardly by spring loaded way 172 (See FIG. 9). The spring bias on the spring loaded way 172 is provided by depression spring 174 which bears against a snap ring mounted on way pin 176. The way pin 176 has a snap ring at its top surface which bears against the top side of the spring loaded way 172. The spring loaded way is supported at its side opposite the ball bearing roller 166 by two ears that contact the data module base casting 170. The action of the two support ears and the spring loaded pin 176 tend to bias the spring loaded way 172 downwardly to load against ball bearing 166b.

Figure 9:
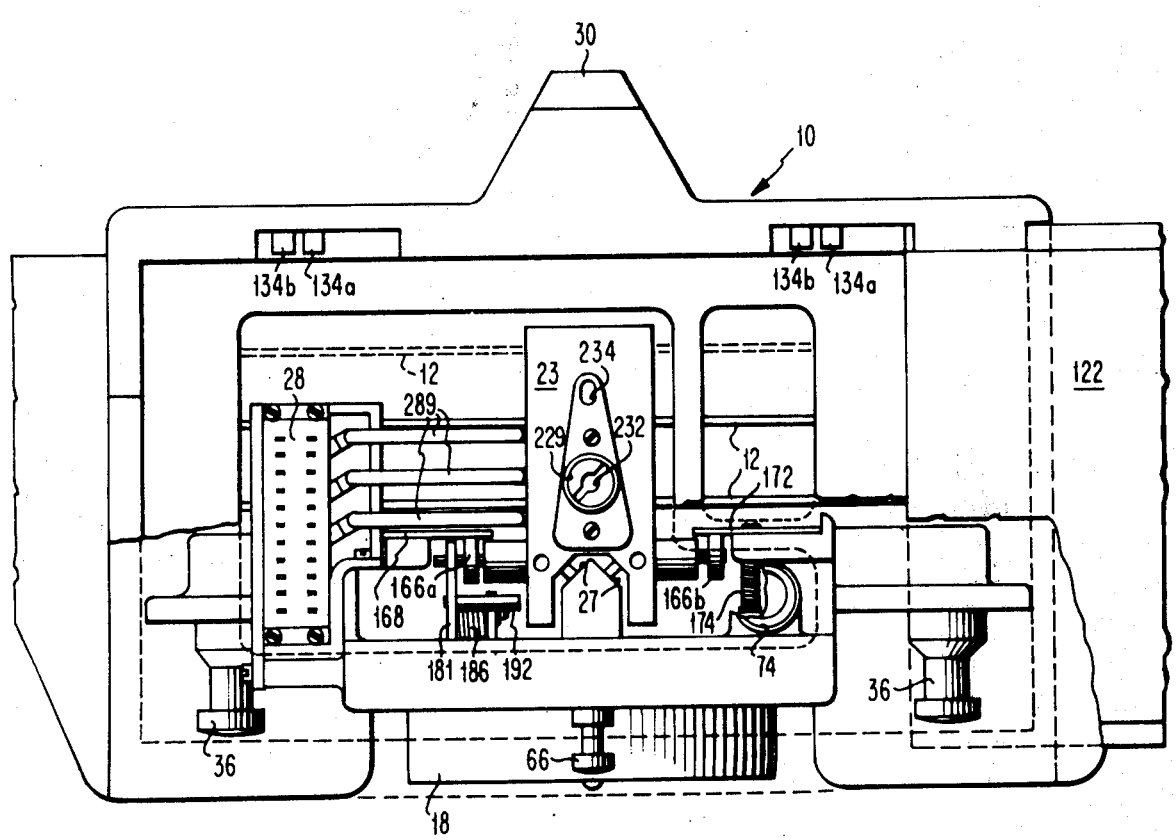
FIG. 9 is a front view of part of the module used in this invention.

The action of the spring loaded way 172 acting on ball bearing 166b tends to pivot the carriage assembly 23 in a counterclockwise direction when viewed through the front of the cartridge, as in FIG. 9. As the carriage rotates, the outrigger bearing 166a bears against the fixed way 168. The carriage incorporates a vertical U-section at its rearward extremity which is utilized to mount the data module transducer arm assemblies 14. The vertical extending U-shaped channel section of the carriage contains horizontal locating slots to position the data module arms. The arm is clamped within the channel section by the action of the arm clamp bolt 180. This clamp bolt extends through the two sides of the vertical U-section, and a nut (not shown) is used to tighten the bolt and provide a clamping force on the arm 14.

The data transducer arm 14 mounts a data transducer at its outward extremity. The transducer is suspended by a suspension element which serves to provide a downward bias force to hold the transducer in intimate contact with the data disk surface, when the disk is not rotating. The carriage arm mounting channel section may be extended vertically to accommodate a number of data arm assemblies.

When the data module 10 is removed from the data file, it is desirable to lock the carriage assembly 23 in a fixed position to prevent damage of the data module components, and to provide a fixed position of the transducer carriage for subsequent coupling to a voice coil motor bobbin assembly, when the data module is reinserted into a similar drive housing 20. The latching of the transducer carriage 23 is accomplished by latching of latch arm 181, as depicted in FIG. 21. The carriage latch arm 181 is pivotably mounted about the latch pivot pin 182. The latch arm 181 incorporates a latching detent notch 184 which serves to engage the extension of the carriage bearing axle 185 for bearing 166a. The latch arm 181 is normally biased upward so that detent notch 184 is engaged with the carriage bearing by the action of latch torsion spring 186. The latch torsion spring 186 is mounted about the pivot pin 182 and has extensions that bear against the data module casting 170 and against the lower surface of the latch lever arm.

The latch lever arm 181 incorporates an interposer surface 188 along its top surface, which serves to prevent the latch from being positioned in its fully latched position, except when the carriage is at the home position. Interposer pin 190 extends from the side of the carriage 23, so as to provide an interposer to prevent upward latch motion in the event the carriage is to the right of the home position, where the axle 185 may be so close to the latch pivot pin 182 as to provide insufficient interposing action from the axle alone.

Unlatching of the carriage latch arm 181 requires a counterclockwise rotation of the latch arm, as illustrated in FIG. 21. The force to overcome the action of latch torsion spring 186 may be applied to the latch arm 181 through the latch pin 192. The latch pin 192 engages with latch release lever 194 when the data module 10 is inserted into the drive housing 20, and is at the registered position. An upward motion of the latch release lever 194 will cause the latch arm 181 to rotate in the counterclockwise direction and disengage from the carriage bearing axle 185.

The carriage latch plate 220 is attached to the outer face of the carriage 23 and provides a means for the carriage to be connected to the voice coil bobbin 22.

Figure 22:
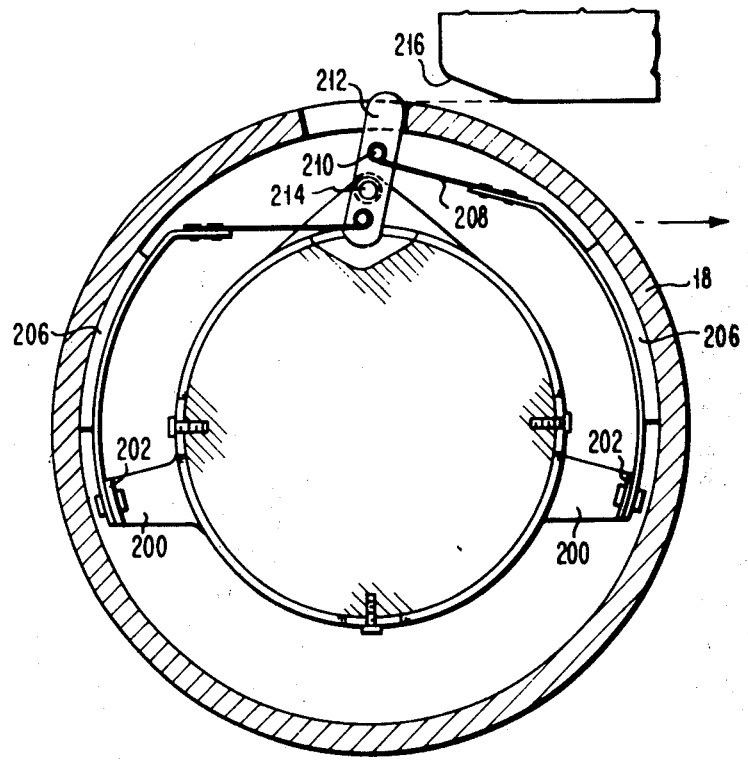
FIG. 22 is a top sectional view of the disk brake mechanism.

FIG. 22 is a section view of the data module looking downward into the top of the data module pulley 18. The spindle brake serves to lock the data module spindle, so that the disks will not rotate when the data module is removed from the drive, thus minimizing the chance of damage to heads and disks by vibration in shipment or during handling. The inner diameter of the pulley 18 serves as a brake drum. Two brake pads 206 are mounted on brake bands 204, which are in turn attached to a mounting bracket 200. The mounting bracket incorporates two ears 202 which extend out from the outside diameter of the module casting lower bearing boss, so as to provide a surface parallel to the brake drum for the attachment of the brake bands 204. The brake bands are riveted to the ears 202 on the bracket 200. The brake band 204 is at its opposite end riveted to operating link 208, which is in turn attached to a link 210 connected to brake lever 212.

The braking force is supplied by the spring action of the brake band 206, whose normal diameter is considerably larger than that of the inner diameter of the data module pulley 18. The action of the two brake bands serves to rotate the brake lever 212 in a clockwise direction. The brake lever is supported on brake lever pivot 214, which is mounted to the mounting bracket 200.

The data module spindle brake may be released when the module is inserted into the data drive assembly. Fixed brake operating cam 216 is positioned in the drive assembly so that the brake lever 212 will come into contact with the cam surface near the end of the insertion stroke into the drive assembly. As the data module is moved in a direction to the right, as viewed in FIG. 22, the contact of lever 212 with the fixed cam surface 216 will force the brake lever 212 to rotate in a counterclockwise direction, thus applying a tension force to the brake bands. This tension force will tend to move the bands and their attached brake pads out of contact with the inner diameter of the data module pulley, thus freeing the pulley for operation by the drive spindle motor 24.

The brake operating cam 216 extends horizontally in a shape suitable for insertion between the top of the pulley 18 and the data module covers.

Figure 15:
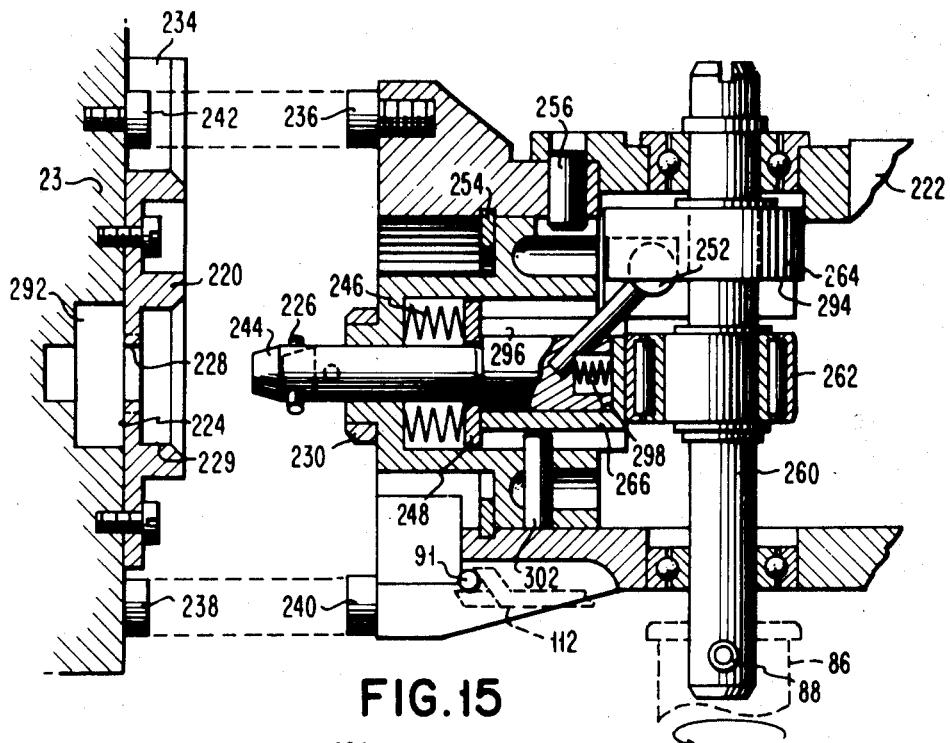
FIG. 15 is a side sectional view of a coupling device and coupling latch plate utilized in the novel apparatus.
Figure 15A:
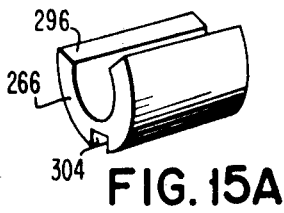
FIG. 15A is a perspective view of a slotted actuator sleeve for accepting a key as employed in the device of FIG. 15.

FIGS. 15, 15A, 16A and 16B illustrate a preferred embodiment of a bobbin-carriage coupling device. FIG. 15 depicts a section view of the bobbin coupling assembly and its mating latch plate 220. The coupling assembly is contained within the voice coil actuator bobbin 222, and the latch plate 220 (see FIGS. 9 and 15) is mounted to the end of carriage 23. The latch plate provides piloting means to locate the bobbin assembly 222 in vertical and horizontal position relative to the carriage. The latch plate 220 also provides a latching surface 224 at its carriage side, which provides a mating surface to mate with cross pin 226 in the bobbin coupling assembly. Latch plate circular pilot hole 228 engages with and initially locates coupling pin assembly 244. Latch plate circular guide 229 provides final alignment by engaging bobbin pilot 230. The entrance to the guide 229, the edge of the bobbin pilot 230, and the end of pin 244 are all tapered to aid in the aligning of the bobbin pilot to the latch plate circular guide 229.

Figure 16A:
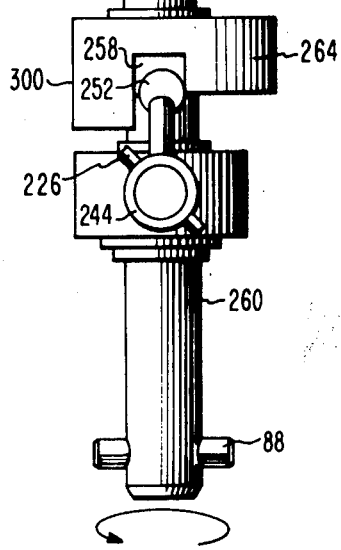
FIGS. 16A and 16B are partial front views of the coupler of FIG. 15, in unlocked and locked positions respectively.

When the bobbin coupling is in its uncoupled position, and a data module is moved toward the bobbin for subsequent coupling, the cross pin 226 is in the position, as illustrated in FIG. 16A. Latch plate 220 incorporates a coupling pin clearance slot 232 (FIG. 9) to permit the coupling pin 226 to pass through the latch plate 220 on initial engagement of the latch plate with the bobbin assembly.

Rotational alignment of the bobbin assembly about the axis of access motion is provided by the interaction between latch plate top guide slot 234 and bobbin top in 236. Parallel alignment between the access axis center line of the bobbin assembly and the access axis of the data module carriage is provided by mating pin surfaces which are carried in both the data module carriage and the bobbin. The face of the two carriage lower pins 238 engage with the face of two bobbin bottom pins 240. The face of carriage top pin 242 engages with the face of bobbin top pin 236. The carriage mounted pins 238 and 242 are held in intimate contact with bobbin mounted pins 240 and 236, respectively through the action of coupling pin assembly 244. The coupling pin assembly 244 is adapted to reciprocate along an axis parallel to the access axis of the bobbin, and is also suited to rotate bidirectionally 45°. The pin assembly 244 is spring biased by Belleville spring washers 246 in a direction toward the VCM actuator 22. The spring washers 246 bear against an internal wall surface of the bobbin pilot assembly 230. A bias force from the washers 246 is applied through washer 248 to the pin assembly 244.

If the cross pin 226 is inserted through the latch plate pin hole 228 and pin clearance slot 232 and is subsequently rotated 45°, the cross pin 226 may no longer be drawn back through cross pin clearance slot 232. If the pin assembly 244 is then forced in a direction to the right, as illustrated in FIG. 15 relative to the pilot assembly 230, the action of the cross pin 226 in bearing against the latching surface 224 will tend to draw the bobbin assembly 222 into contact with the data module carriage assembly 23, and the two bobbin bottom pins 240 will be forced into contact with the two carriage bottom pins 238. The bobbin top pin 236 will be forced into engagement with carriage top pin 242.

Longitudinal and rotational control of the pin assembly 244 to accomplish automatic coupling and uncoupling is provided by the bobbin coupling assembly. The bobbin pilot assembly 230 is retained in the bobbin assembly 222 by snap ring 254. Rotational positioning of the bobbin pilot assembly is provided by locating pin 256, which engages a slot in the top of the bobbin pilot assembly 230.

When the coupling is in its engaged position and attached to the data module carriage assembly, washer 248 bears against a shoulder at the rear of the pin assembly 244. The longitudinal and rotational control of the pin assembly 244 is provided by means of an eccentric shaft 260 which accommodates a mounted needle bearing 262 and an actuator cam 264. The needle bearing provides longitudinal positioning of the pin assembly 244, and the actuator cam provides rotational positioning of the pin assembly 244.

FIG. 15 illustrates the coupling assembly in the uncoupled position. In this mode, needle bearing 262 bears against actuator sleeve 266. The actuator sleeve 266 incorporates a bore designed to accommodate the shouldered end of pin assembly 244. The depth of the bore in the actuator sleeve 266 is slightly longer than the length of the shouldered section of pin assembly 244. When the eccentric shaft 260 is rotated (as in FIG. 15) to bring the needle bearing 262 into engagement with the outer end of sleeve 266, the sleeve is moved to engage washer 248, thus removing the load of Belleville spring washers 246 from the pin assembly 244. Further motion of the eccentric shaft and the needle bearing 262 causes the actuator sleeve 266 to move to the left, so that the end of the internal bore in sleeve 266 engages the end of pin assembly 244. Further motion of the needle bearing 262 will thus cause the pin assembly to move to the left.

Ball arm 252 engages ball slot 258 in actuator cam 264 in the uncoupled position, as in FIG. 16A. Clockwise rotation of eccentric shaft 260 will cause the rotation of the actuator cam 264, and thus cause movement of ball arm 252, so as to rotate pin assembly 244 counterclockwise, as viewed in FIG. 16B. The eccentric shaft is designed for approximately 112° of total rotation. As illustrated in FIGS. 15 and 16A, the bobbin and pin assembly is shown in its uncoupled position with the cross pin 226 at 45° to the vertical, and the pin assembly 244 extended outwardly from the bobbin assembly 222 by the action of eccentric shaft 260. In this position, actuator cam 264 bears against a stop surface 267 with counterclockwise stop 265 (see FIGS. 15 and 16B).

When viewed from the top, the eccentric shaft is positioned so that the high point of the eccentric relative to pin assembly 244 is approximately 20° counterclockwise from the access center line of the bobbin assembly. The thrust load supplied by the Belleville washers 246 tends to force the eccentric shaft to rotate in a counterclockwise direction, thus forcing counterclockwise stop 265 into intimate contact with stop surface 267.

During normal loading of the data module into the drive assembly, when the carriage 23 is brought into position to where the cross pin 226 is positioned behind surface 224 in cavity 292, the coupling is ready for actuation to couple to the carriage assembly. The eccentric shaft is rotated in a clockwise direction, when viewed from the top, to couple the bobbin assembly to the carriage assembly. During initial coupling rotation of the eccentric shaft 260, ball slot 258 tends to rotate pin assembly 244 through the action of ball arm 252. As the eccentric shaft 260 is rotated clockwise about 20°, pin assembly 244 is extended slightly further from bobbin assembly 222, and cross pin 226 is rotated approximately 20° to a position about 70° from the vertical. Additional clockwise motion of the eccentric shaft 260 completes the rotation of the cross pin to the horizontal position illustrated in FIG. 16B.

Figure 16B:
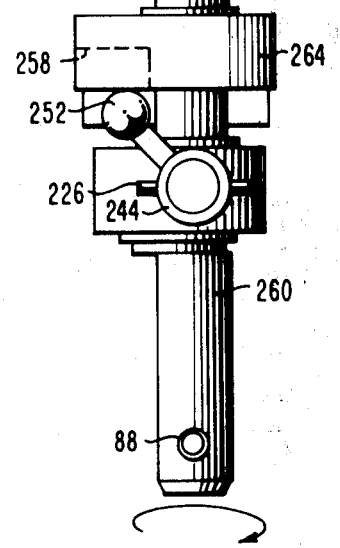
Figure 18:
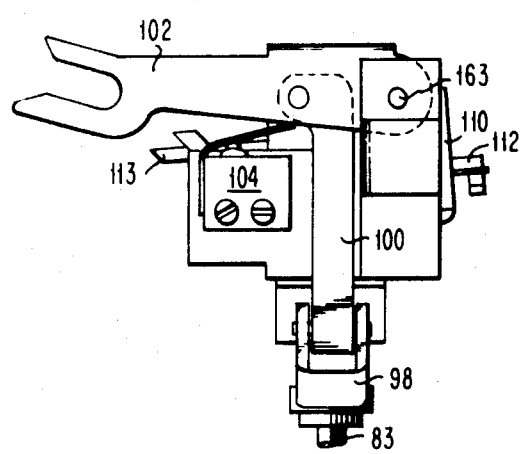
FIG. 18 is a right side view of the upper portion of FIG. 17.
Figure 20:
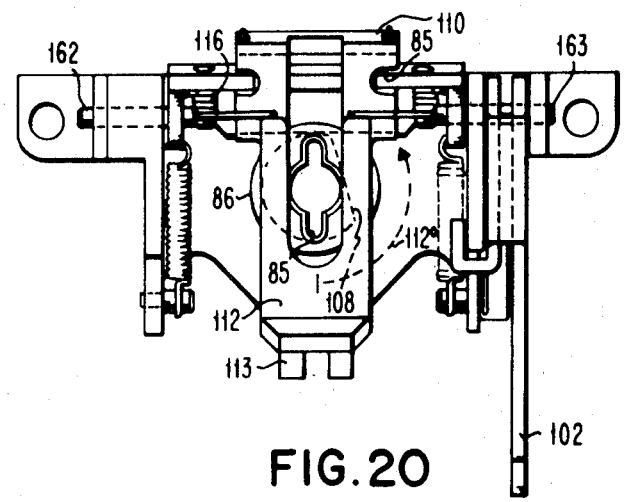
FIG. 20 is a top view of the assembly of FIG. 17.
Figure 19:
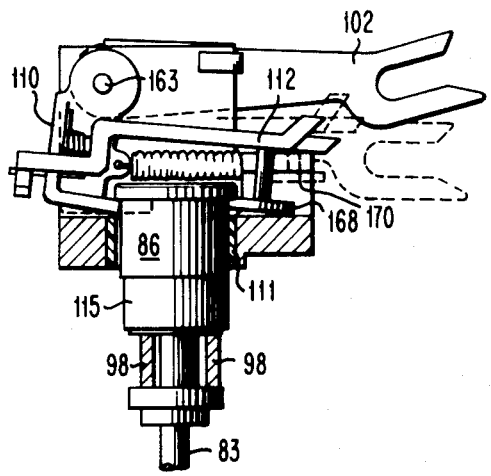
FIG. 19 is a left side view of the same portion of FIG. 17.
Figure 17A:
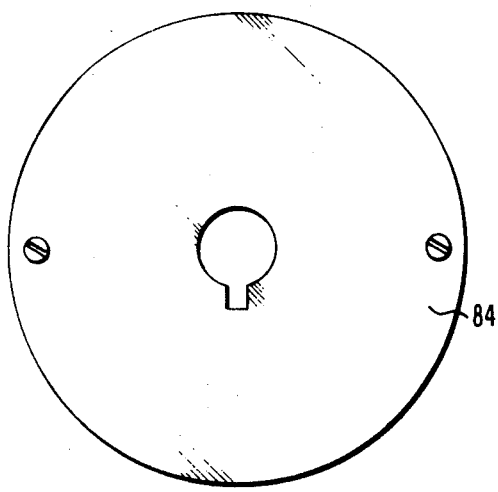
FIG. 17A is a plan view of a detent bearing employed in the structure of FIG. 17.
Figure 17:
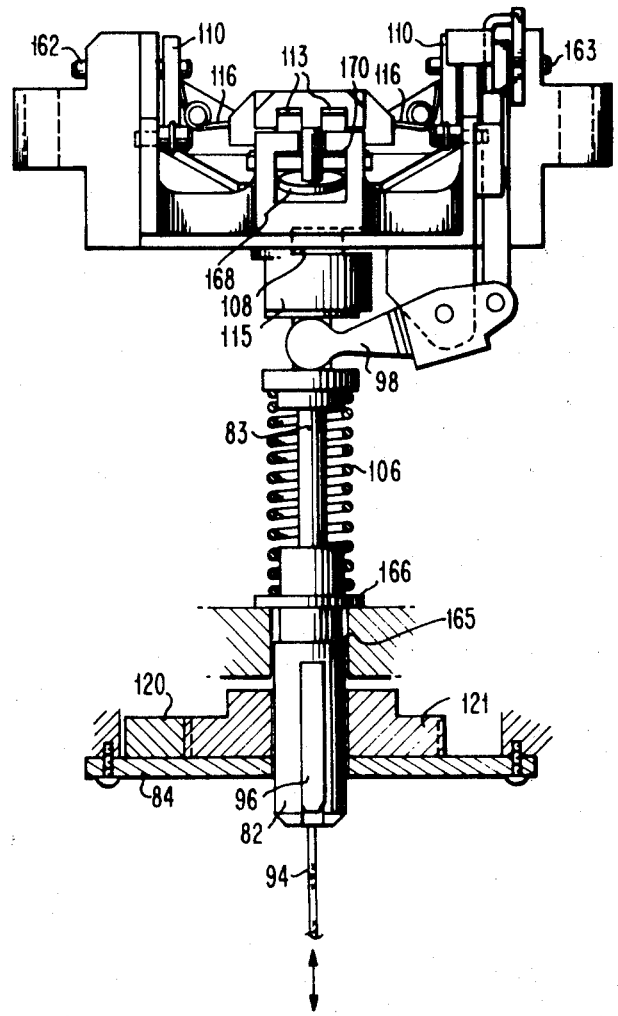
FIG. 17 is a front view of a coupler support and actuator.

At the position illustrated in FIG. 16B, the ball arm 252 has been rotated so that the ball is removed from ball slot 258, and lower cam surface 294 is positioned above the ball. Further coupling pin rotation is limited by the sidewall of ball arm clearance slot 296 (See FIG. 15A). The eccentric shaft is free to turn after 45° of clockwise motion without causing further motion of the ball arm 252. This further eccentric motion allows the eccentric shaft to move needle bearing 262 to the left in FIG. 15 so that Belleville washers 246 may force pin assembly 244 and cause cross pin 226 to contact surface 224. This contact under the load of Belleville washers 246 draws bobbin assembly 222 into intimate contact with carriage 23.

Detent spring 298 maintains actuator sleeve 266 in contact with needle bearing 262, and provides a bias force to force clockwise stop 300 into contact with stop surface 267 at the end of the coupling cycle. Slot 261 in eccentric shaft 260 permits manual operation of the coupler. Pin 302 engages key slot 304 in sleeve 266 to provide rotational position of the sleeve relative to pilot 230.

The coupling assembly described provides a simple coupling arrangement suitable to couple bobbin 222 to carriage 23 while maintaining careful alignment of bobbin to carriage. The coupling is suitable for manual or automatic machine operation.

The Belleville washers 246 may be sized so as to provide axial coupling forces greater than the acceleration forces normally experienced by the bobbin/carriage system. The combination of axial and rotational motions of the pin assembly 244 permit the axial coupling load to be removed from the pin assembly prior to rotation, thus minimizing coupling loads applied to the carriage, and minimizing the effort required to rotate the pin assembly.

The bearing supported eccentric shaft 260 is self-contained in the bobbin assembly, so that relatively high axial coupling forces, such as 50–100 lbs., can be utilized with only 3–4 inch lbs. of input torque required to operate the eccentric shaft.

The alignment of bobbin 222 to carriage 23, provided by the action of mating pins 238 and 242 to pins 240 and 236, along with the axial and rotational alignment provided by latch plate 220 and the mating force supplied by Belleville washers 246, assure that the coupled bobbin may be fully supported and aligned by carriage 23. The air gap of VCM 22 in which the bobbin coil is suited to operate may be sized to accommodate bobbin alignment tolerances so that no VCM bobbin guides are required.

To disengage coupler 26 from carriage 23, the carriage is first positioned by the VCM actuator in its home position where axle 185 may be engaged with latching detent notch 184. With the carriage at home position, and cable solenoid current off, release latch torque spring 186 and compressed spring 106 act together to raise acceptor 86 to rotate pivot lever 98 clockwise as in FIG. 17, and to rotate latch release 102 counterclockwise and downward (see FIG. 18). Thus, latch arm 181 is rotated clockwise (see FIG. 21) to engage latching detent notch 184 with axle 185. Microswitch 104 is actuated by the latch release lever.

The carriage is now latched and coupler 26 has its eccentric shaft 260 engaged by acceptor 86, so that bayonet pin 88 is engaged by slot 85. Acceptor 86 is attached to coupling driver 82 by flexible shaft 306. At the end of the upward motion of the acceptor and driver, key 96 is raised out of the slot in detent bearing 84 thus freeing the acceptor and driver for rotation under control of rack 120 (see FIG. 17).

As the acceptor 86 is raised, it comes into contact with nesting plate 112, and raises first the end of the nesting plate closest to carriage 23, and then raises the opposite nesting plate end, so that the nesting plate is brought into close proximity to the bobbin assembly 222.

To uncouple coupler 26 and to complete the bobbin retention cycle, rack 120 is moved in a direction away from the VCM by rotation of camshaft 42. The camshaft is controlled by the opening of door 40, which turns gear 121, driver 82, and acceptor 86 counterclockwise, as viewed from the top in FIG. 20. Counterclockwise rotation of acceptor 86 rotates coupling eccentric shaft 260 to force needle bearing 262 into contact with sleeve 266 and thus move pin assembly 244 toward carriage 106 and out of contact with surface 224. After approximately 70° of eccentric shaft rotation, actuator cam 264 engages ball arm 252, and pin assembly 244 is rotated clockwise, as viewed in FIGS. 16A and 16B, to the position shown in FIG. 16A, where cross pin 226 is aligned 45° to the vertical.

Rotation of the eccentric shaft 260 in the counterclockwise direction places the ends of bayonet pin 88 under nesting plate 112, thus positively locking the coupler 26 and bobbin 222 to the nesting plate.

As the acceptor is rotated counterclockwise, yoke cam surface 108 permits yoke 110 to be pulled in a direction away from the VCM by the action of tension springs 117. The yoke is pivotable supported in frame 103 by pivot pin 162 and pivot pin 163. Pivot pin 163 also provides a pivot for latch release lever 102.

The movement of yoke 110 away from the VCM carries nesting plate 112 into contact with bobbin retainer pin 91, so that the bobbin retainer pin is held in the fork 113 formed at the end of the nesting plate.

A second acceptor cam surface 115 on the acceptor 86 permits the acceptor, and the bobbin 222 to move away from the VCM under the force of tension springs 117 to assure proper mating of coupler and data module on the next data module loading cycle.

The clearance between sleeve bearing 111 and acceptor cam surface 115 provides a controlled amount of freedom of horizontal motion for the acceptor and bobbin so as to assure that bobbin pilot 230 will be in position to mate with carriage latch plate 220 and may move slightly on engagement to accommodate dimensional tolerances.

Vertical positioning of the bobbin assembly is accomplished by limiting the vertical stroke of coupling driver 82 by means of shoulder 176 and washer 177. The contact of shoulder 175 and washer 177 stops further upward motion of the acceptor 86, and thus limits the upward motion applied to nesting plate 112, and establishes the normal vertical position of the retained bobbin 222.

The nesting plate is biased down by torsion springs 116 carried on yoke 110, to normally rest on top of acceptor 86, when the bobbin is retained. A nesting plate positive upward limit stop is furnished by vertical stop 173 which may contact frame stop surface 170. The bobbin is thus compliantly positioned along the access center line of the VCM, ready to accept the mating of a data module carriage, with a forward bias toward the carriage and with some controlled freedom of motion toward the VCM in the vertical axis, and in the horizontal axis normal to the access center line.

The coupling/bobbin retention release and uncoupling/bobbin retention actions described are so mechanically interlocked as to assure that the upward motion of the acceptor can only occur when the bobbin is at its home position, and the coupling rotation and uncoupling rotation of the acceptor can only occur when the acceptor and driver are in the full up position. Also the acceptor can be withdrawn from the bobbin and the transducer carriage unlatched only when the acceptor and coupling eccentric shaft are rotated to the coupled position.

With further reference to FIG. 3, data module casting 179 provides a rigid common structure to support spindle 16 and the ways supporting carriage 23. Data module casting also supports three data module registration points which are used to align the data module to the drive housing 20. These three registration points are the registration feet 36 and cone socket 74. The casting also supports load pin 66 which is utilized to transfer the data module registration force to the data module. The casting provides a bearing housing for two spindle bearings, the lower bearing of which is actually preloaded by Belleville washers 272. Disk hub assembly 276 is rigidly attached to spindle 16 by means of bolt 270. The hub assembly provides a reference surface to support the disk stack, which is held in permanent position by a clamping bell, and a series of clamp bolts attached to the hub assembly.

The data module has a cover 268 which encloses the components of the data module and protects them from physical damage and particle contamination when the module is removed from the drive housing. The cover incorporates a slidable door 122 illustrated in FIGS. 5 and 6. The cover incorporates elastomer seals at all joints, to assure an airtight data module enclosure. The covers may be fabricated of a suitable moldable plastic material to provide a semi-rigid enclosure, thus providing some shock absorption for the data module components in the event of rough data module handling.

It can be seen in FIG. 3 that the data module pulley 18, registration feet 36 and load pin 66 are all placed in the cavity of the lower portion of the data module covers with the bottom of the covers extending below these components to protect them from undue impact.

Filtered air to control particle contamination is supplied to the data module by an air shroud 278. The filtered air flow supplied by the air shroud is channeled into two passages. Passage 280 supplies contamination control air for the data module. The VCM cooling passage 279 supplies filtered air to cool the voice coil motor. The air shroud meets with the data module when the data module is fully registered in the drive housing. The mating face of the air shroud incorporates a flexible air shroud seal to contact and seal with the face of the data module cover. The mating face of the data module is also the door sealing surface 127.

Filtered air is circulated through the data module by being introduced at air inlet 284, shown in FIGS. 3 and 9. The air is exhausted from the data module and passed through the voice coil motor via air outlet port 286. The entering and exiting flows from the data module are separated by barrier seal surface 288. The two air flows are further separated by air inlet duct 285, which serves to introduce the inlet air to the edge of the rotating disks. The rectangularly shaped air shroud seal surrounds the air inlet port 284 and air outlet port 296. The air shroud seal also incorporates a section to seal against the barrier seal surface 288 to further separate the two air flows. The exhaust air from the data module and the air from the VCM cooling air passage are introduced to the voice coil motor through an aperture in the VCM front shield 290.

Air outlet port 286 provides functional access to the data module components required to connect with the drive housing assembly. This port 286 provides access to electrical connector 28, carriage latch arm 181, carriage latch plate 220 and cone socket 74. The air outlet port also provides clearance for the data module carriage to move outward through the port during track accessing near the outer periphery of the data module disks. The electrical signals from the transducer assembly 14 are directed to connector 28 via flexible transducer pigtail 289. Connector 28 mates with a drive housing connector, mounted within the air outlet port opening of the air shroud 278. Connector 28 provides contact pins for data transducers and a servo transducer, by way of example, as well as pins suited to permit identification encoding to note cartridge configuration, such as the number of heads and disks. A fixed data module cover size may accommodate a number of different disk and head combinations.

FIGS. 23–25 illustrate an alternative coupling device, for connecting the voice coil motor bobbin to the head carriage assembly of the module 10. To this end, a collet type bobbin coupling device is used that incorporates a push rod element mount to the head carriage assembly.

Data module casting 179 supports the carriage push rod 310 by means of two sleeve bearings 312. Rotation of the carriage assembly 23 which is attached to the push rod 310 is prevented by a carriage fin 314, which slides in a slot in a plastic block 316.

A crash stop is provided in the data module by an elastomer block 318 to prevent the carriage or heads from being damaged in the event of a runaway condition of an actuator system. The push rod 310 extends from the front face of the data module, and incorporates on its outer end a data module coupling adapter 320. This adapter is protected from damage during data module handling by an extension of the data module covers 322. The data module is retained and registered in the drive in the same manner previously described.

The voice coil actuator bobbin winding 324 is supported by a bobbin tube 326, which is used to mount the collet chuck assembly to the bobbin, and also provides a surface to contact the elastomer crash stop 318.

When the data module is removed from the drive, the bobbin assembly is supported by chuck retainer and operating assembly 328 and by the contact of tube 326 with the internal bore of the VCM. The chuck retainer and operating assembly 328 is reciprocated vertically to engage and support the collet chuck assembly, and to move downward out of engagement with the chuck assembly, so that free motion of the bobbin and push rod is permitted once the chuck and push rod are connected. The collet chuck assembly is supported by a coupling support actuator disk 330 which rests in cavity 332 in the chuck retainer and operating assembly. The side walls of cavity 332 provide a horizontal limit to the motion of the disk 330. A stationary vertical stop 334 is provided above the collet assembly to limit the upward motion of the assembly. When the chuck retainer and operating assembly is engaged with the chuck, two rollers 335 contact the rear of disk 330.

With reference to FIG. 25, a collet sleeve 336 is axially split to incorporate two opposed flexure section 338 which attach to a collet locking surface 340. The collet locking surface has a locking cam surface 342 and a closure cam surface 344. The sleeve 336 is attached to a cone tip 346, which is supported, in turn, by the bobbin tube 326. The collet flexures 338 are formed so that the locking surface 340 is normally forced open, to accept the insertion of the coupling adapter 320. The cone tip 346 is engaged with the data module coupling adapter cone 348, when the data module is inserted into the drive.

The coupling cone tip 346 and the coupling adapter cone 348 are held in contact by the camming action of the collet locking surface 340, which engages a coupling adapter locking surface 350 carried on the data module coupling adapter 320. The collet locking surface 340 is forced into engagement with the mating surface 350 by the action of cam rollers 354. The sleeve 356 is able to reciprocate longitudinally, in an axis parallel to the center line of the carriage and bobbin access direction. The sleeve 356 is biased in a direction toward the data module, so as to force collet locking surface 340 into engagement with the coupling adapter locking surface 350 by means of rollers 354 and compression spring 360. The coupling outer sleeve 356 incorporates two ears 362, which may be engaged to force the sleeve in a direction toward the VCM and compress spring 360. The collet cam rollers are supported by bearing axles 364.

The chuck retainer and operating assembly 328 is reciprocated upwardly by means of a lever 366, so as to support the coupling support and actuator disk 330. The upper travel of the collet chuck assembly is limited so that locating cavity 332 will be nominally positioned to the center line of the VCM, so as to support the disk 330 somewhat below its normal center line vertically. This provides approximately 0.020 inches of motion of disk 330 below its normal operating center line. Vertical limit stop 334 is similarly positioned to permit the disk 330 to move about 0.020 inches above its normal operating center line.

The side walls of cavity 332 permit approximately ± 0.020 inches of horizontal motion of the disk 330 normal to the access direction. This controlled degree of freedom of the movement of disk 330 assures that the coupling action between the data module and the VCM can occur even with slight tolerance differences between data modules and drives.

When the data module has been removed from the drive, the coupling outer sleeve 356 is held in its rearward position with spring 360 compressed so as to permit the collet locking surfaces 340 to be in their normally open position. Motion of the coupling outer sleeve 356 is accomplished by the action of rollers 368 and 370 which engage ears 362 and force the sleeve 356 in a direction toward disk 330. Disk 330 is in turn retained by rollers 335. The moving rollers 368 and 370 are carried in a pivoted forward bearing yoke assembly 376, which is carried in flexible pivot support plates 380. The flexible plates 380 also support pivot pin 382, which supports rear bearing yoke 384. The rear bearing yoke has a backup bearing 386 which limits rotation of the yoke. Flexible pivot support plates 380 permit the bearing yokes to move in the horizontal plane, when the rollers on the chuck retainer and operating assembly 328 are engaged with the collet chuck assembly. The rollers on the chuck retainer operating assembly yokes permit the chuck assembly to move up and down within the restraints provided by the locating cavity 332 and the vertical stop 334. The flexible support plates are clamped by blocks 390 to the chuck retainer base 392. This base has way surfaces on its exterior which are located and supported by bearings 394 a, b, c. A total of six bearings are utilized to provide for the location and vertical travel of the base 392.

Actuation of the forward yoke arm 376 is provided by the action of flexible tension cable 408. This cable is routed over pulley 410 pivotably supported in base 392. The flexible cable 408 is carried through flexible tube 412 attached to the bottom of the base 392. Compression spring 414 forces the forward yoke arm 376 normally into an open position to permit clearance with ears 362, when the chuck retaining and operating assembly 328 is forced upward into engagement with the collet chuck. The flexible cable may be operated by a solenoid 418 (represented by the arrow) or other linear actuation means.

Base 392 is positioned vertically by means of a lever 420. This lever is in turn operated by a cam (not shown). The lever 420 is pivotably supported by a pivot pin 424, which is carried in the drive base casting. The location bearings 394 a, b, c are also supported by the drive base casting.

With the coupling retained in the disengaged condition as described above, a data module may be inserted into the drive. The data module will move horizontally toward the voice coil actuator until a locating cone 74 engages a fixed locating ball 76 in the drive as shown in FIGS. 1 and 3.

As the data module is moved into engagement with the locating ball, connector 28 will connect with a mating electrical connector in the drive. Coupling adapter cone 348 will be inserted between open collet locking surfaces 340 and will contact or come within 0.030 inches of coupling cone tip 346.

After the data module completes its insertion motion, the coupling unit is ready to lock and engage with the coupling adapter cone 348. The tension cable 408 is released by the action of the solenoid 418 permitting forward bearing yoke 376 to pivot toward the data module under the urging of compression spring 414 and compression spring 360. Spring 360 forces the coupling outer sleeve 356 toward the data module so that rollers 354 first contact collet closure cam surfaces 344, thus forcing the collet locking surfaces 340 closed, so as to capture the coupling adapter cone 348 by engaging with coupling adapter locking surfaces 350. The motion of the outer collet sleeve continues so that cam rollers 354 next contact collet locking cam surfaces 342. The effective cam angle of these surfaces is slight so that the coupling outer sleeve may apply a high locking force through surface 340 to coupling actuator locking surfaces 350. The locking forces tend to draw the coupling adapter cone 348 and the coupling cone tip 346 into intimate contact, so that the coupling adapter cone may align the coupling cone and thus the bobbin to a common axis with the carriage push rod 310.

The locked coupling now firmly attaches the bobbin to the carriage push rod. The clearance between the walls of the VCM gap and the bobbin (0.020 – 040 inches on each side of the bobbin tubular wall) assures that the bobbin will not contact the VCM gap even with normal manufacturing tolerances in the data module drive system.

The clearances provided between the coupling support actuation disk 330 and the vertical stop 334 and locating cavity 332 permit the coupling assembly to move during the coupling operation to accommodate alignment tolerances.

The bearings on the arms of the chuck retainer and operator assembly 328 permit vertical motion of the chuck relative to the operator. The flexure plates 380 permit horizontal motion of forward bearing yoke 376 and rear bearing yoke 384 in a direction normal to the centerline of access motion. The vertical and horizontal motions noted are permitted while spring 360 is still compressed by the action of arms yokes 376 and 384 thus assuring ease of alignment between the chuck and the carriage push rod.

After the coupling action is complete, the chuck retainer and operating assembly 328 is moved downward by the action of lever 420 and a cam (not shown). The assembly 328 is moved downward far enough so that the carriage push rod/bobbin assembly may be moved along the access axis without interference from assembly 328.

After the coupling action is completed, the carriage latch (such as shown in FIG. 21) may be released.

There has been described herein a novel data module that provides a unique magnetic disk storage suitable for interchange between disk drive housings. The data module incorporates those mechanical components that control data head to data track alignment. Precise data head to data track alignment is achieved, because each data head reads only data it has written. The spindle drive and head actuator are contained in the drive to provide a lightweight portable data module.

In a preferred embodiment, the data module incorporates a recorded servo track reference disk surface and a servo transducer. The unique combination of data module components permits precise data head to data track alignment, when data modules are interchanged without requiring precision adjustment of the transducers relative to one another during manufacture or use.

The disclosed data module incorporates a sealed container with a door means suitable to provide file housing interface to data head transducers, data head carriage latch, module registration means and air porting means. The module covers are suited to fit into a file housing shroud, so as to guide the data module from operator insertion to file data module/drive registration.

The associated drive housing incorporates cam driven module loading means and registration means to assure the proper automatic sequence and timing of data module load/unload operation.

While a particular embodiment of a belt pulley spindle driving means has been described, other spindle drive means suitable for coupling to a data module may be employed. One alternative spindle drive means is a friction wheel drive suited to engage with the data module pulley, by way of example.

The disclosed belt pulley embodiment of the spindle drive offers a simple approach suited to accommodate relatively high starting and stopping torques with little pulley slippage. The belt idler arm structure is able to hold a drive belt in readiness for data module loading, and to release the drive belt once the data module is fully registered in the drive.

Two actuator coupling embodiments have been described. Alternative actuator-to-data module carriage coupling means may be obvious to those skilled in the art. The preferred coupler embodiment taught herein offers a coupling device capable of providing a rigid coupling for a voice coil actuator bobbin, wherein the bobbin, when coupled, is supported and aligned by the data module carriage.

Also, each of the bobbin retention and coupling actuators described provide a compliant positioning of the bobbin so as to accommodate dimensional tolerance variations between drives and data modules. The preferred retention/coupling embodiment incorporates mechanical interlocking means to permit data module carriage release only when the carriage is coupled to the bobbin assembly.

The preferred embodiment of this invention utilizes transducers suited for landing and take-off respectively on and off the data module disk surfaces. These transducers may be of a type significantly smaller in size, mass, and disk loading forces than those commonly used in disk files. The disclosed apparatus does not require head load/unload mechanisms, but simply utilizes the hydrodynamic action of the rotating disk surface air film to lift and load the head during disk rotation start up and stopping. When the disks are stopped, the heads rest against the disk surface. An electromechanical brake 450 mounted on drive motor 24 serves to reduce motor and disk stopping time to minimize head/disk wear.

To facilitate use of the sealed data module in a wide range of environments, including different atmospheric pressures, a breather port with an air filter may be incorporated in the data module to equalize internal and external pressures. The filtered breather port permits the module to retain effective sealing against external contaminants.

While the disclosed embodiment of this invention utilizes moving data heads, it is obvious that fixed data heads may also be incorporated in the data module.

What is claimed is:

1. A data module drive unit comprising in combination:
    a. means for receiving an interchangeable data module;
    b. a motor including a bobbin element disposed in a flux gap of said motor to move towards and away from a received module;
    c. connector means attached to said bobbin and selectively operable to connect said bobbin to a movable transducer carriage assembly in said module to cause said transducer carriage to be moved by said motor and to cause said carriage during movement to maintain said bobbin aligned in said gap.

2. The combination recited in claim 1 in which said motor is a voice coil motor having a magnetic structure defining a cylindrical flux gap and said bobbin element comprises a cylindrical coil disposed coaxially with said cylindrical gap.

3. The combination recited in claim 2 in which said means for receiving a data module includes means for guiding a received data module in a direction parallel to the direction of movement of said bobbin element.

4. The combination recited in claim 2 further including means for moving said module along said guiding means.

5. The combination recited in claim 3 further including a rotary motor adapted to rotate the disks in said module.

6. The combination recited in claim 5 further including means for automatically coupling said rotary motor to said data module in response to movement of said data module along a path defined by said guiding means.

7. The combination recited in claim 6 further including means on said drive adapted to coact with said module to automatically register said module in a predetermined position relative to said drive as said module is moved towards said bobbin element.

8. The combination recited in claim 1 further including means for automatically operating said bobbin connector means to connect and disconnect said bobbin from said transducer carriage assembly in said module.

9. A data module drive unit adapted to receive an interchangeable data module to provide a random access data storage file in which data is transferred to and from concentric recording tracks on magnetic disks in said module through magnetic transducers permanently mounted within said module for movement parallel to the surface of the disks and along a radial line relative to the axis of rotation of said disks and wherein said module includes a first interface member adapted to rotate said disks and a second interface member adapted to move said transducers along said radial line, said members being disposed in a predefined accurate spatial relationship relative to each other, said drive unit comprising in combination:
  motor means including a third interface member adapted to be coupled to said first interface member;
  actuator means including a fourth interface member adapted to be coupled to said second interface member;
  means for receiving said module to position said first and third interface members in a couplable relationship in the same plane, and said second and fourth interface members in a couplable relationship in another plane, the two planes being substantially parallel to each other; and
  means adapted to provide relative movement between said module and said drive in a direction parallel to said planes to automatically complete said coupling relationships.

10. A data module drive unit adapted to receive an interchangeable data module to provide a random access data storage file in which data is transferred to and from concentric recording tracks on magnetic disks in said module through magnetic transducers permanently disposed within said module and arranged for movement parallel to the surface of the disks along a radial line relative to the axis of rotation of said disks and wherein said module includes a first interface member adapted to rotate said disks and a second interface member connected to move said transducers along said radial line, said members being disposed in a predefined accurate spatial relationship relative to each other, said data module drive unit including in combination:
  actuator means including a third interface member adapted to be rigidly coupled to said second interface member;
  means for receiving said module to position said second and third interface members in a couplable relationship; and
  means operable to automatically couple said second and third interface members when positioned in said couplable relationship.

11. The combination recited in claim 10 in which said actuator comprises a fixed element and a movable element connected to said third interface member.

12. The combination recited in claim 10 in which said actuator comprises a voice coil motor having a magnetic structure defining a flux gap and a bobbin element movable in said flux gap and means attaching said third interface member to said movable bobbin element to cause said bobbin element to be supported by said second interface member whenever said second and third members are rigidly coupled.

13. The combination recited in claim 10 further including means on said drive adapted to coact with said module to automatically register said module in a predetermined position relative to said drive as said module is moved towards said drive.

14. The combination recited in claim 13 further including electrical connector means on said drive to provide transfer of signals between said drive and said module.

15. The combination recited in claim 14 in which said electrical connector means is adapted to automatically interconnect to said module as said module is registered in said predetermined position.

16. The combination recited in claim 15 further including rotary motor means on said drive adapted to coact automatically with said module to rotate the disks in said module when said module is registered in said predetermined position.

* * * * *